Figure 1:
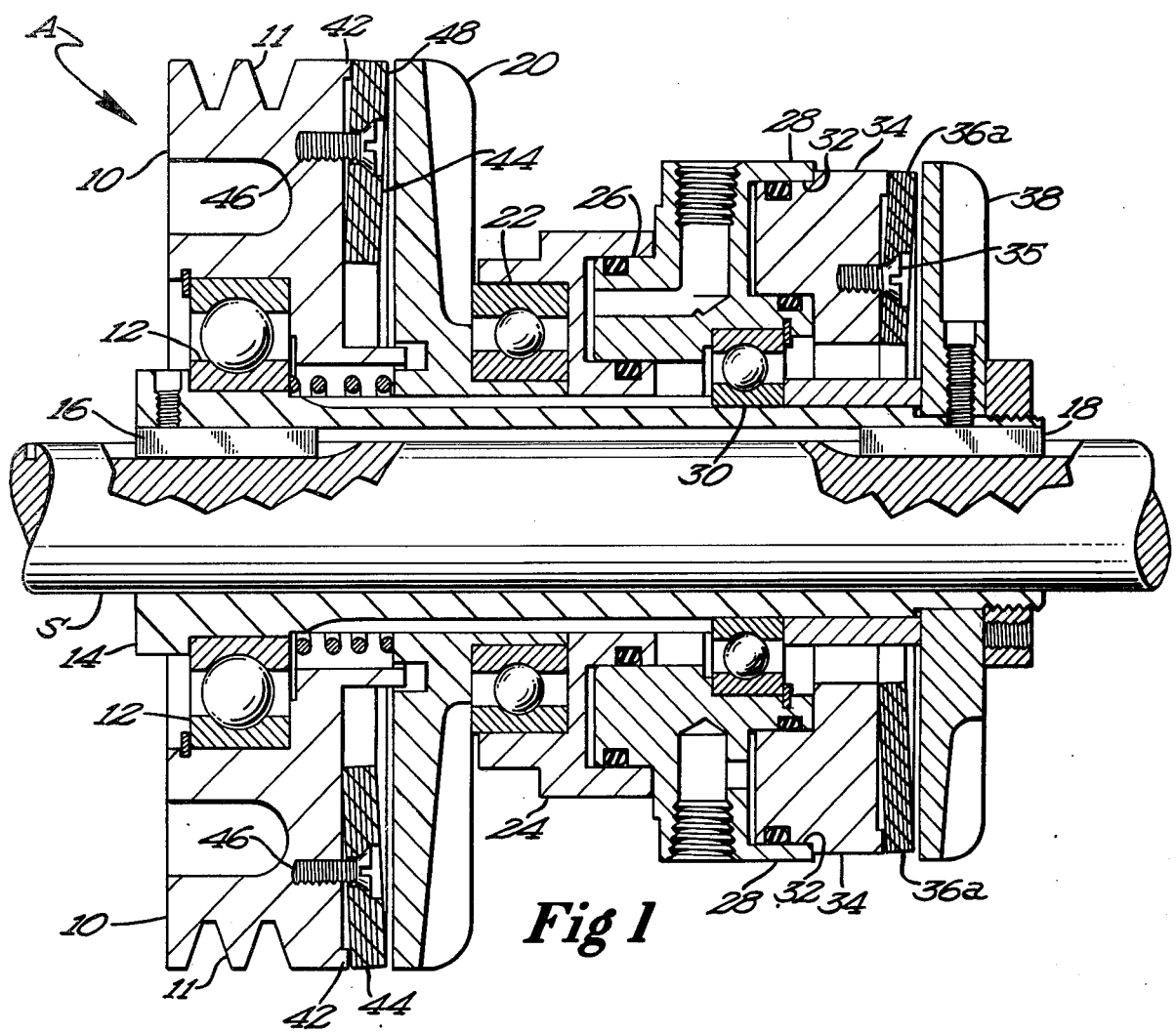

United States Patent [19]

Hanks

[11] 4,450,947

[45] May 29, 1984

[54] COMBINATION FRICTION RING AND MOUNT THEREFOR FOR CLUTCHES, BRAKES AND THE LIKE

[75] Inventor: James V. Hanks, Minneapolis, Minn.

[73] Assignee: Horton Manufacturing, Co., Minneapolis, Minn.

[21] Appl. No.: 325,597

[22] Filed: Nov. 27, 1981

[51] Int. Cl.³ .............................................. F16D 13/38
[52] U.S. Cl. ............................. 192/107 R; 192/70.14
[58] Field of Search ............ 192/107 R, 107 C, 70.14, 192/70.15, 111 R; 188/71.1, 73.2, 218 XL

[56] References Cited

U.S. PATENT DOCUMENTS

| 769,543 | 12/1904 | Heaslet . | |
|---|---|---|---|
| 923,613 | 6/1909 | Atwood | 192/66 X |
| 1,571,746 | 2/1926 | Wemp | 192/70.14 |
| 1,750,828 | 3/1930 | Wemp | 192/70.18 |
| 1,804,904 | 5/1931 | Wemp | 192/107 C |
| 1,934,109 | 11/1933 | Wemp | 192/107 C |
| 2,023,772 | 12/1935 | Russo | 192/70.15 |
| 2,567,168 | 9/1951 | Goodchild | 192/66 X |
| 3,250,353 | 4/1966 | Liszewski et al. . | |
| 3,253,686 | 5/1966 | Scheverer | 192/66 X |
| 3,305,054 | 4/1967 | Liszewski et al. . | |
| 3,982,611 | 9/1976 | Gannon | 188/71.1 |
| 4,238,013 | 12/1980 | Goscenski | 192/70.14 |

FOREIGN PATENT DOCUMENTS

| 2557766 | 12/1975 | Fed. Rep. of Germany | 188/218 XL |
|---|---|---|---|
| 2837634 | 11/1980 | Fed. Rep. of Germany . | |
| 1440334 | 2/1976 | United Kingdom . | |

Primary Examiner—Rodney H. Bonck
Assistant Examiner—James J. Merek
Attorney, Agent, or Firm—Wicks & Nemer

[57] ABSTRACT

A combination friction ring and mount therefor for clutches, brakes and the like is shown according to the teachings of the present invention as including a circular friction disc member having a substantially flat face. The face has a shoulder thereon at the outer periphery thereof and a substantially flat ring friction lining secured upon the flat face of the circular member and the shoulder.

3 Claims, 3 Drawing Figures

U.S. Patent        May 29, 1984        4,450,947

COMBINATION FRICTION RING AND MOUNT THEREFOR FOR CLUTCHES, BRAKES AND THE LIKE

SUMMARY

The invention relates broadly to friction clutches and brakes employing friction linings and more particularly to the installation and securing of new and unused ring style friction lining onto a drive or stationary disc mounting the same.

In known drive or stationary discs which mount new ring style linings, the same are simply secured substantially flat upon the facing surface of the disc. As a result, it has frequently occurred that the inner diameter of the friction ring was canted slightly outwardly of the surface of the disc which inner area had to be worn down through use before full torque contact between lining and opposed friction discs was obtained. The canting outwardly of the face of the drive disc at the inner diameter of the new and unused friction interface lining allows the outer diameter to be depressed axially thereby creating an interface gap in the area of the outer periphery. Further, as a result of manufacture and operative deflection of both the disc mounting and friction discs, the natural tendency is for the aforementioned gap to increase on which the lining is mounted. As a result in initial use, there is a torque deficiency because contact is at the inner diameter of the lining.

Initial contact during engagement at the inner diameter area of the lining with the friction disc as in conventional clutches and brakes is undesireable due to the fact that less torque is obtained relative to the outer diameter.

It is therefore an object of the invention to provide a construction of the face of the drive or mounting disc which includes providing an annular shoulder at the outer diameter of the drive disc or mounting disc. The lining is secured to a disc with the inner diameter upon the face of the disc with the outer diameter portion upon the formed shoulder whereby the lining is canted slightly with the outer diameter of the lining in a plane raised from that of the inner diameter of the lining. As a result, such raising and positioning of the lining compensates for the aforementioned fact that the outer diameter of a disc is in effect depressed axially slightly as a result of manufacture and operative deflection of the disc due to the location of the piston force upon the friction disc that engages the friction lining which conventionally engages the inner surface of the lining with the minimum of torque supplied.

With the outer area of the lining raised, the initial contact of engagement between the friction disc and lining is assured to take place nearer the outer diameter thus providing maximum possible initial torque with a new lining. After several engagements of lining and friction disc, natural wear causes the raised lining portion to be worn away and ultimately the entire surface of the ring disc becomes the clutching or braking interface as is desired and accomplished only by a "working in" in a conventional clutch or brake having less torque on initial engagement. With the present invention, new lining torque can be expected to be equal to or even greater than fully worked in torque. With new lining and the present invention, the initial operation is with greater torque than in conventional lined brakes and clutches.

The invention further provides the manufacturer with the economy and simplicity of using conventional standard flat friction lining thereby requiring no special lining. With the subject invention, the cure for the problem as set out above is permanently built into the clutch or brake and is therefore provided to the user for subsequent replacement of lining using conventional flat lining from various and easily available sources.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 1. is a longitudinal sectional view through a combination clutch-brake with a ring-like lining secured to the drive disc of the clutch and the stationary disc of the brake and embodying the invention.

Figure 2:
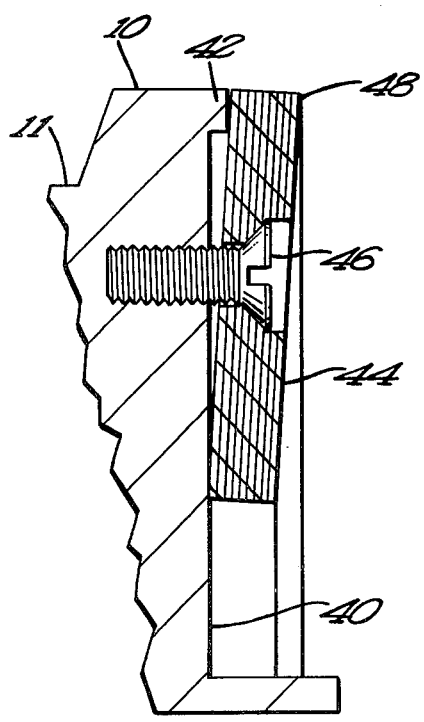

FIG. 2. is an enlarged section through the lining and mounting construction therefor.

Figure 3:
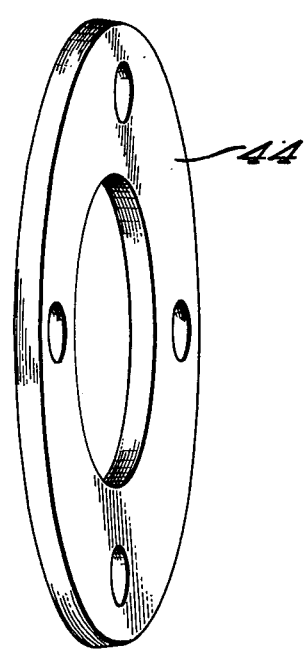

FIG. 3 is a perspective view of a conventional ring-like lining for clutch or brake used with the invention.

Referring to the drawings in detail, the clutch-brake unit A includes in the clutch portion thereof the drive disc 10 having the V-grooves 11 for V-belts not shown. The drive disc is mounted on the bearing 12 which in turn is mounted on the hub 14 which is keyed to the shaft S by means of the keys 16 and 18. The friction disc 20 is mounted on the bearing 22 which bearing is also mounted on the annular clutch cylinder 24 in which the annular piston 26 of the combination piston-cylinder 28 is mounted. The piston-cylinder is also mounted on the bearing 30 mounted on the hub 14. Thus the shaft S is rotatably mounted within the clutch-brake unit. The piston-cylinder 28 includes the cylinder 32 in which the brake piston 34 is mounted. The non-rotative piston-stationary disc 34 has mounted thereon by means of bolts 35 the friction lining 36a according to the invention. Secured to the shaft 10 is the brake friction disc 38 engageable with the friction lining 36a by means of actuation of the piston-stationary disc 34 and cylinder 32.

The face surface 40 of the drive disc 10 has formed thereon the projection in the form of the annular shoulder 42 at the outer periphery of the disc 10. Further illustrated is the conventional friction ring 44 and the same is secured to the face 40 of the drive disc 10 by means of the bolts 46 with the outer edge of the lining upon the shoulder and the inner diameter edge upon the face 40 whereby the lining is canted slightly so that the outermost peripheral edge portion as at 48 is in a plane outwardly of the plane of the inner-diameter of the lining ring 44. As the friction disc 20 is moved axially to the lining by means of fluid pressure into the cylinder 24 via the conduit 25 by conventional means, contact of the lining is made initially at the outer edge as at 48. With several operations of the clutch, the outer portion of the lining 44 is worn down with substantially full contact between lining and friction disc 20 with maximum torque obtained initially by contact at the outer edge rather than at the inner edge as with presently known clutches and brakes.

In the brake portion of the clutch-brake shown in the drawings in FIG. 1., the lining 36a is the same type as the lining 44 of the clutch and is mounted in the same manner on the surface of the non-rotative piston-stationary disc 34 opposed to the friction disc 38. As the piston-stationary disc 34 is moved axially to the lining 36a by means of fluid pressure in the cylinder 32 via the conduit 33 by conventional means, contact of the lining is made initially at the peripheral edge as at 50 and the operation is as above with lining 44.

Having thus described the invention, what is claimed as new and desired to be secured by Letters Patent is:

1. A device having opposed circular members with parallel and facing surfaces for friction engagement of the members one with the other, the facing of one of said circular members having substantially rigid shoulder means formed on the outer portion of the surface thereof, a friction ring secured to the facing surface of said one circular member with the outer peripheral edge portion of the inner surface in contact with said shoulder means and the inner edge portion of the inner surface in contact substantially with said facing surface to thereby cant slightly said lining relative to said facing surface of said one circular member.

2. The device of claim 1 in which said member means is continuous.

3. a mount for a flat ring friction lining including in combination:
   (a) a circular member having a flat face,
   (b) said face having a substantially rigid shoulder thereon at the outer periphery thereof,
   (c) a flat ring friction lining secured upon said flat face of said circular member and said shoulder with the outer periphery of the inner surface in contact with said shoulder and the inner surface in contact with said shoulder and the inner edge portion of the inner surface in contact substantially with said face to thereby cant slightly said lining relative to said face of said circular member.

* * * * *

UNITED STATES PATENT OFFICE
CERTIFICATE OF CORRECTION

Patent No. 4,450,947            Dated     May 29, 1984

Inventor(s)    James V. Hanks

It is certified that error appears in the above-identified patent and that said Letters Patent are hereby corrected as shown below:

Claim 2, line 1, cancel "member" and substitute therefor --shoulder--.

Signed and Sealed this

Twenty-seventh Day of November 1984

[SEAL]

Attest:

Attesting Officer

GERALD J. MOSSINGHOFF

Commissioner of Patents and Trademarks